US 8,476,814 B2

(12) United States Patent
Ibi et al.

(10) Patent No.: US 8,476,814 B2
(45) Date of Patent: Jul. 2, 2013

(54) LAMP DEVICE

(75) Inventors: Takashi Ibi, Saitama (JP); Sumio Uehara, Saitama (JP); Kyouichi Maseki, Saitama (JP); Yosuke Kano, Saitama (JP); Toshitaka Higuchi, Tokyo (JP)

(73) Assignees: Iwasaki Electric Co., Ltd., Tokyo (JP); Fujii Optical Co., Ltd., Tokyo (JP)

( * ) Notice: Subject to any disclaimer, the term of this patent is extended or adjusted under 35 U.S.C. 154(b) by 0 days.

(21) Appl. No.: 13/130,121

(22) PCT Filed: Dec. 3, 2008

(86) PCT No.: PCT/JP2008/071924
§ 371 (c)(1),
(2), (4) Date: Jul. 7, 2011

(87) PCT Pub. No.: WO2010/058489
PCT Pub. Date: May 27, 2010

(65) Prior Publication Data
US 2011/0260600 A1 Oct. 27, 2011

(30) Foreign Application Priority Data
Nov. 20, 2008 (JP) .................................. 2008-297196

(51) Int. Cl.
*H01J 5/16* (2006.01)
(52) U.S. Cl.
USPC .......................................... 313/113; 313/110
(58) Field of Classification Search
USPC .................. 313/113, 110; 315/291; 362/265, 362/267
See application file for complete search history.

(56) References Cited

U.S. PATENT DOCUMENTS 7,224,107 B2  5/2007  Moench et al.
7,661,830 B2  2/2010  Takezawa et al.

FOREIGN PATENT DOCUMENTS

| JP | 6-251604 | 9/1994 |
|---|---|---|
| JP | 3184404 | 4/2001 |
| JP | 2001-125197 | 5/2001 |
| JP | 3204733 | 6/2001 |
| JP | 2005-505909 | 2/2005 |
| JP | 2005-70429 | 3/2005 |
| JP | 2005-309372 | 11/2005 |
| JP | 2006-292903 | 10/2006 |
| JP | 2006-294268 | 10/2006 |
| JP | 2007-73276 | 3/2007 |
| JP | 2008-112622 | 5/2008 |

OTHER PUBLICATIONS

English translation of JP2007073276A to Tamaru.*

* cited by examiner

*Primary Examiner* — Anne Hines
(74) *Attorney, Agent, or Firm* — Greenblum & Bernstein, P.L.C.

(57) ABSTRACT

A light utilization efficiency of a high-pressure discharge lamp is improved even in a case of reducing the size of a reflection mirror without using an auxiliary reflection mirror. In a lamp device where a portion of lights emitted from a discharge bulb to the periphery thereof in forward and backward directions for a predetermined range of angle is reflected at a concave reflection mirror and illuminated to a light collection area of a predetermined size formed forward of the lamp, a prism surface having an angle of refracting or deflecting at least a portion of lights emitted from the discharge bulb that is not reflected at the concave reflection mirror to the light collection area is formed to the outer peripheral surface of the discharge bulb.

8 Claims, 13 Drawing Sheets

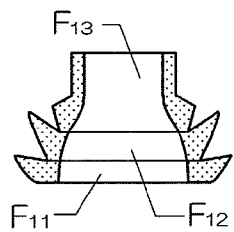
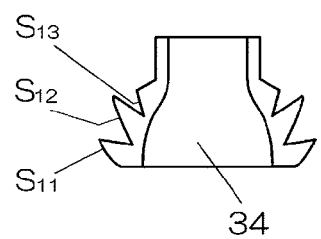
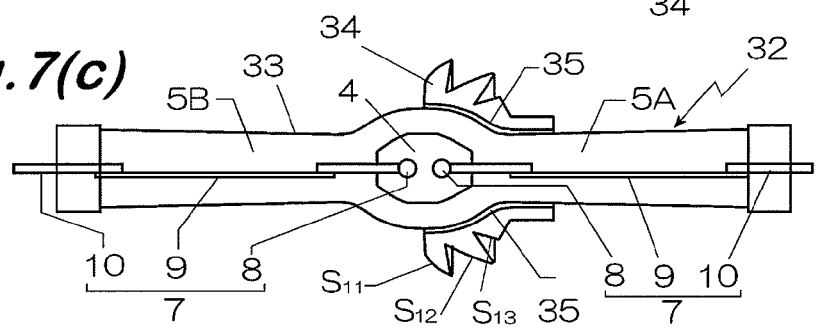
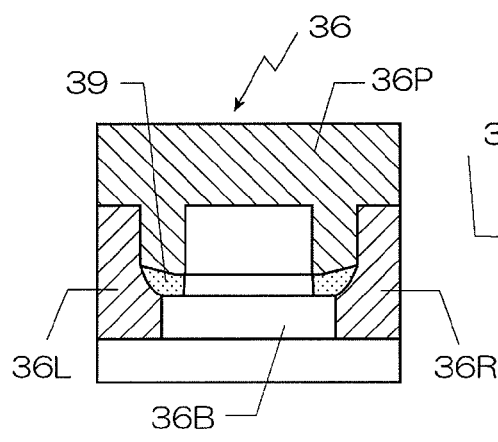
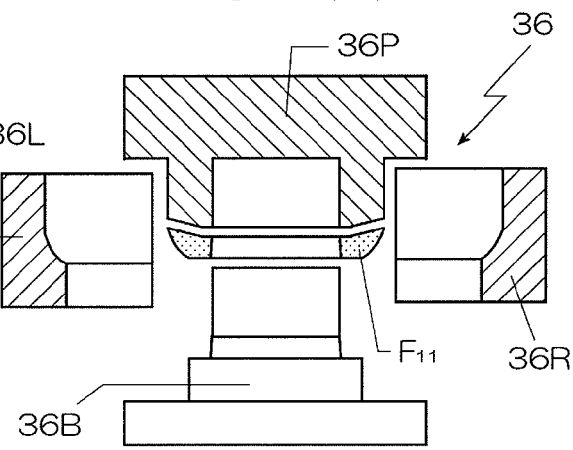

LAMP DEVICE

TECHNICAL FIELD

The present invention concerns a lamp device used, particularly, as a light source for a liquid crystal projector or a DLP projector, in which a high-pressure discharge lamp having a discharge bulb formed with seal portions on both forward and backward ends of the discharge bulb for inserting and sealing electrode assemblies therein is attached to a concave reflection mirror.

BACKGROUND ART

A liquid crystal projector is a video equipment in which a light emitted from a light source is transmitted through an optical system (homogenizer) such as a rod lens or an array lens for homogenizing light distribution and then illuminated at the back of an image forming liquid crystal panel thereby reflecting imaging video images on a forward screen. A DLP projector is a video equipment of a type for projecting video images by utilizing a reflection type optical element referred to as a DMD device (Digital Micromirror Device) instead of the liquid crystal panel.

FIG. 14 shows a fundamental constitution of an existent light device 61 which is disposed as a light source in an equipment such as a liquid crystal projector, and it has a high-pressure discharge lamp 62 and a concave reflection mirror 63 comprising an ellipsoidal mirror or a parabolic mirror for reflecting the light.

In the high-pressure discharge lamp 62, a pair of electrode assemblies 67 are inserted in an arc tube 56 having seal portions 65A and 65B formed on both forward and backward axial ends while interposing a discharge bulb 64 therebetween through the seal portions 65A and 65B thereof.

The electrode assembly 67 is formed by welding an electrode top end 68 comprising tungsten, a molybdenum foil 69, and a molybdenum wire 70 in series, and the seal portions 65A and 65B are sealed air tightly in a state that the discharge electrode tops 68 are opposed each other in the discharge bulb 64.

Then, the tube axis $Z_P$ of the high-pressure discharge lamp 62 and the optical axis $Z_L$ of the concave reflection mirror 63 are arranged coaxially with a seal portion 65A of the high-pressure discharge lamp 62 on the side of the opening 53a of the concave reflection mirror 63 and the other sealing portion 65B on the side of the bottom 63b of the concave reflection mirror 63.

Thus, a light emitted from the discharge bulb 64 to the periphery thereof in forward and backward directions within a predetermined range of angle is reflected at the concave reflection mirror 63 and collected and illuminated to a light collection area SP of a predetermined size such as a light incident surface of a light distribution homogenizing optical system 71, for example, a rod lens disposed forward of the lamp.

In this case, when a relatively large size of a reflection mirror 63 is used as shown in FIG. 15(a), most of lights emitted for a range of angle $\theta_{21}$ can be utilized effectively. However, in a case of reducing the size of a concave reflection mirror 63 as shown in FIG. 15(b) along with a demand for reducing size and weight of the device, the light utilizing efficiency is inevitably lowered.

When the size of the concave reflection mirror 63 is made smaller, among the lights emitted from the discharge bulb 64 for a predetermined angle $\theta_{21}$, only the light emitted backward for a predetermined angle $\theta_{22}$ is reflected at the concave reflection mirror 63 and reaches the light collection area SP, whereas the light emitted forward for a predetermined angle $\theta_{23}$ leaks to the periphery and does not reach the light collection area SP. As a result, this causes a problem that not only the light utilizing efficiency is lowered but also the light is illuminated to casing parts, etc. in the liquid crystal projector equipment to deteriorate, break or denature them.

FIG. 16 is a graph showing a light distribution relating to the light emitting direction. The abscissa shows the direction of an tube axis $Z_L$ of a high-pressure discharge lamp 62, the ordinate represents the direction passing a light emission point on the tube axis $Z_L$ and crossing the tube axis $Z_L$ at a right angle, and the coaxial scales represent the ratio of the amount of light assuming that it is 100% in the direction of the ordinate.

It can be seen that what is utilized effectively among the lights emitted from the high-pressure discharge lamp 62 is only the light emitted backward for a predetermined angle $\theta_{22}$ (82 to 145°) and the light emitted for an angle $\theta_{23}$ (45 to 82°) in an amount of light from 60 to 100% is not utilized at all.

Accordingly, as shown in FIG. 17(a), it has been proposed to dispose an auxiliary mirror 72 or reflection film (not illustrated) for reflecting the light from the discharge bulb 64 of the high-pressure discharge lamp 62 to the frontal opening portion 63a of the concave reflection mirror 63 to the center of the discharge bulb 64 (light emitting point) (refer to Patent Documents 1, 2, 3, and 4).

According to this constitution, a light emitted backward for a predetermined angle $\theta_{24}$ is reflected at the concave reflection mirror 63 and reaches a light collection area SP, while a light emitted forward for a predetermined angle $\theta_{25}$ is reflected at the auxiliary reflection mirror 72 and again passed through the center of the discharge bulb 64 (light emission point), reflected at the reflection mirror 63 on the backward side and reaches the light collection area. Accordingly, leakage of light illuminated forward can be suppressed and the light utilizing efficiency is also high.

[Patent document 1] JP-A No. 2005-309372
[Patent document 2] JP No. 3184404
[Patent document 3] JP No. 3204733
[Patent document 4] JP-T No. 2005-505909

However, since the auxiliary reflection mirror 72 or reflection film reflects the light emitted from the discharge bulb 64 to the discharge bulb 64, the electrode disposed in the discharge bulb 64 is overheated by the reflection light and the amount of the electrode material to be evaporated and scattered from the top end thereof is increased, which is deposited to the inner surface of the discharge bulb 64 to possibly cause early blackening. At the same time, the temperature at the inner surface of the discharge bulb 64 on the side of the seal 65A is remarkably elevated due to the heat radiated from the electrode top that is at the height temperature during lighting of the lamp or due to the heat transmitted from the portion to possibly bulge or burst the discharge bulb 64.

Further, as shown in FIG. 17(b), it is also possible to improve the light utilizing efficiency of the high-pressure discharge lamp device 71 by providing an auxiliary reflection mirror 73 that does not reflect the light emitted from the discharge bulb 64 of the high-pressure discharge lamp 62 to the front opening 53a of the concave reflection mirror 63 but directly reflect the light forwardly (refer to Patent Document 5).

Also in this case, the light emitted backward for a predetermined angle $\theta_{26}$ is reflected at the concave reflection mirror 63 and reaches the light collection area SP, whereas the light emitted forward for a predetermined angle $\theta_{27}$ is reflected at the auxiliary reflection mirror 73 and reaches the light collection area SP. Accordingly, leakage of the light emitted forward can be suppressed and the light utilizing efficiency is also high.

[Patent Document 5] JP-A No. 2001-125197

However, since the reflection film of the auxiliary reflection mirror 73 is generally formed by stacking thin dielectric films by several tens layer or more, production is troublesome and time consuming to increase the manufacture cost, as well as it results in a problem in view of the durability such as degradation and peeling of the reflection film.

Further, the auxiliary reflection mirror 73 has to be supported by a spoke 74 made of metal. Accordingly, when the lamp 62 is lit, shadow of the spoke 74 is projected, light distribution is lost due to distortion of the spoke 74 or the spoke is oxidized and rusted due to overheating.

DISCLOSURE OF THE INVENTION

Subject to be Solved by the Invention

Then, it is a technical subject of the present invention to improve the light utilization efficiency of a high-pressure discharge lamp even in a case of reducing the size of a reflection mirror without using an auxiliary reflection mirror, etc.

Means for Solving the Subject

For attaining the subject, the present invention provides a lamp device including;

a high-discharge lamp and a concave reflection mirror for reflecting a light therefrom, in which the high-pressure discharge lamp has an arc tube having seal portions formed on both forward and backward ends in the direction of a tube axis interposing a discharge bulb therebetween, where electrode assemblies are inserted from both of the seal portions, the seal portions are airtightly sealed in a state of that electrode discharge tops are opposed each other in the discharge bulb, and is disposed in a state of aligning the tube axis with the optical axis of the concave reflection mirror, and a portion of a light emitted from the discharge bulb to the periphery thereof in the forward and backward directions for a predetermined range of angle is reflected at the concave reflection mirror and illuminated to a light collection area of a predetermined size formed forward of the lamp, wherein a prism surface is formed to the outer peripheral surface of the discharge bulb at an angle for refracting or reflecting at least a portion of lights emitted from the discharge bulb that is not reflected at the concave reflection mirror to the light collection area.

Effect of the Invention

According to the present invention, the prism surface is formed to the outer peripheral surface of the discharge bulb, and at least a portion of the lights emitted from the discharge bulb of the lamp that is not reflected at the concave reflection mirror is refracted or reflected toward the light collection area formed forward of the lamp.

Accordingly, since the direction of the light not reflected at the concave reflection and is out of the light collection area by due to reduction in the size of the concave reflection mirror can be changed and the light is illuminated to the light collection area, the light utilizing efficiency is improved.

Then, since the prism is used instead of the reflection mirror as means for changing the direction of the light, this can be formed of quartz glass, etc. which is identical with that for the discharge bulb.

Accordingly, since it is not necessary to form expensive reflection films, the manufacturing cost can be decreased by so much and there is no possibility of degrading the reflection film.

Further, since the prism can be formed integrally with or fused to the arc tube, it is not necessary to be supported by using a metal material and, accordingly, there is no problem of distortion and rusting by metal oxidation due to overheating.

Best Mode for Practicing the Invention

For attaining the purpose of improving the light utilization efficiency of a high-pressure discharge lamp without using an auxiliary reflection mirror or an auxiliary reflection mirror, a prism surface is formed to the outer peripheral surface of a discharge bulb at an angle for refracting or reflecting at least a portion of lights emitted from the discharge bulb that is not reflected at the concave reflection mirror.

The present invention is to be described with reference to embodiments shown in the drawings.

FIG. 1 is explanatory views showing an example of a lamp device according to the invention and a light distribution thereof, FIG. 2 is an explanatory view showing a molding die for an arc tube used therefor, FIG. 3 is an explanatory view showing manufacturing steps of the arc tube, FIG. 4 is explanatory views showing another embodiment according to the present invention, FIG. 5 is explanatory views showing a molding die for a prism used therefor, FIG. 6 is explanatory views showing a further embodiment and a light distribution thereof, FIG. 7 is explanatory views showing manufacturing steps of the arc tube therefor, FIGS. 8 to 10 are explanatory views showing a molding die for a prism used therefor, FIG. 11 is an explanatory view showing a further embodiment according to the present invention, FIG. 12 is outer views thereof, and FIG. 13 is an explanatory view showing manufacturing steps of the prism.

EMBODIMENT 1

FIG. 1 shows an example of a lamp device according to the present invention. A lamp device 1 has a high-pressure discharge lamp 2 and a concave reflection mirror 3 comprising an ellipsoidal mirror or a parabolic mirror for reflecting a light therefrom.

Then, the lamp device is used, for example, as a light source for a liquid crystal projector and arranged such that a light transmitting a light distribution homogenizing optical system (homogenizer) 11 such as a rod lens or an array lens is illuminated at the back of a liquid crystal panel as an image forming section (not illustrated).

The high-pressure discharge lamp 2 has an arc tube 6 having seal portions 5A and 5B formed on both forward and backward axial ends interposing a discharge bulb 4 between them, and a pair of electrode assemblies 7 are inserted from both of the seal portions 5A and 5B.

The electrode assembly 7 is formed by welding an electrode top 8 comprising tungsten, a molybdenum foil 9, and a molybdenum wire 10 in series, and the seal portions 5A and 5B are airtightly sealed in a state that the electrode discharge tops 8 are opposed each other in the discharge bulb 4.

Then, the high-pressure discharge lamp 2 and the concave reflection mirror 3 are fixed such that the tube axis $Z_P$ of the lamp 2 and the optical axis $Z_L$ of the reflection mirror 3 are situated coaxially, with the seal portion 5A of the lamp 2 on the side of the opening 3a of the reflection mirror 3 and the other seal portion 5B on the side of the bottom 3b of the reflection mirror 3.

Thus, a portion of lights emitted from the discharge bulb 4 to the periphery thereof in forward and backward directions within a range of predetermined angle (mainly backwarding light) is reflected at the concave reflection mirror 3 and collected and illuminated to a light collection area SP of a predetermined size such as a light incident surface of a light distribution homogenizing optical system 11 such as a rod lens disposed forward of the lamp.

Further, an annular prism surface 12S is formed to the outer peripheral surface of the discharge bulb 4 on the side of the seal portion 5A at an angle for totally reflecting at least a portion of lights emitted from the discharge bulb 4 that is not reflected at the concave reflection mirror 3 (mainly forwarding light) to the light collection area SP.

In this embodiment, the discharge bulb 4 is bulged circularly on the side of the seal portion 5A to integrally form a prism 12 and the back surface of the prism 12 constitutes the annular prism surface 12S.

The annular prism surface 12S is formed as a concave surface having such an outwardly bulging shape when the arc tube 6 is cross-sectioned along a plane containing an tube axis Z that the light emitted from the discharge bulb 4 and reflected at the prism surface 12S does not diverge out of the light collection area SP.

Further, the frontal side of the prism 12 opposing the opening 3a is formed into a substantially planar shape, so that the light reflected at the prism surface 12S is illuminated to the frontal direction.

FIG. 2 shows a die for forming the arc tube 6 of the high-pressure discharge lamp 2 and FIG. 3 shows a process for forming the arc tube.

A die 13 includes a lower die 14L and an upper die 14U in which a concave portion 15 is formed in the lower die 14L in the half-spherical shape when the arc tube 6 is cross-sectioned along a plane containing the tube axis $Z_P$ and a convex portion 16 forming a hollow portion in the arc tube is formed in the upper die 14U.

When the arc tube 6 is manufactured, fine quartz particles are filled under pressure in the concave portion 15 of the lower die 14L, and the upper die 14U is joined and clamped to form a ½ molding product for sintering. When they are sintered in an upturned state, a half-arc tube body 6h of a shape bisecting the arc tube 6 along the tube axis $Z_P$ is formed.

Then, as shown in FIG. 3, the two half-arc tube bodies 6h are joined and heated again with frit glass or the like being interposed at the mating part, the frit glass is melted and the half-arc tube bodies 6h are fused together to form the arc tube 6.

In this state, when electrode assemblies 7, 7 are inserted from the seal portions 5A and 5B on both sides and the seal portions 5A and 5B are airtightly sealed in a state that the electrode tops 8 are opposed each other in the arc tube 4, a high-pressure discharge lamp is formed.

Then, when the high-pressure discharge lamp 2 is fixed to the concave reflection mirror 3 with the frontal side of the prism 12 on the side of the opening 3a of the reflection mirror 3, the lamp device is completed.

A constitutional example of a invention is as has been described above and the function thereof is to be described.

When the high-pressure discharge lamp 2 is lit, light is emitted from the discharge bulb 4 to the periphery thereof in forward and backward directions for a predetermined range of angle.

FIG. 1(b) is a graph showing a light distribution to the emitting direction of a light while defining the amount of light in the direction perpendicular to the tube axis $Z_P$ as 100%, and assuming the forward direction of the tube axis $Z_P$ as 0° and the backward direction thereof as 180°. The abscissa represents the direction of the tube axis $Z_L$, the ordinate represents the direction passing the light emission point on the tube axis $Z_L$ and perpendicular to the tube axis $Z_L$ of the high-pressure discharge lamp 2, and coaxial scales represent the ratio of the amount of light.

The light emitted from the discharge bulb 4 to the periphery thereof for the range of angle of 45 to 135° has an amount of light of 60% or more, in which a light $L_1$ emitted for the range of angle $\theta_1$ (90 to 130°) on the backward side is reflected at the concave reflection mirror 3 and reaches the light collection area SP.

Further, a light $L_2$ emitted forward for the range of angle $\theta_2$ (60 to 88°) is reflected at the annular prism surface 12S formed to the outer circumference of the discharge bulb 4, illuminated toward the frontal side, and reaches the light collection area SP.

In this case, assuming a high-pressure discharge lamp of an existent type with no prism 12, the light $L_{22}$ emitted for the range of angle $\theta_{22}$ (82 to 145°) is reflected at the concave reflection mirror 3 and reaches the light collection area SP.

On the other hand, in this embodiment, since the prism 12 bulges to the outside of the discharge bulb 4, a light $L_3$ for a range of angle $\theta_3$ (130 to 145°) emitted to the backwardmost side is shielded by the prism 12.

However, since a light $L_4$ in an amount of light of from 60 to 100% for the range of angle $\theta_4$ (60 to 82°) which was lost so far is reflected at the prism surface 12S and illuminated to the light collection area SP, the light utilization efficiency is improved sufficiently even if the light $L_3$ in amount of light of 60% or less is shielded.

In this case, since the light emitted from the discharge bulb 4 and incident to the prism 12 is totally reflected due to the difference of the refractive index generated at the interface between the prism surface 12S and external air, it is not necessary to form expensive reflection films, the production cost can be decreased by so much, and there is no possibility for the degradation of the reflection film.

Further, since the prism 12 is formed integrally with the arc tube 4, a metal part such as a spoke for supporting the same is not necessary and, accordingly, there is no problem of distortion of the metal part or rusting by metal oxidation due to overheating.

EMBODIMENT 2

FIG. 4 is an explanatory view showing another embodiment of the invention in which portions in common with those in FIG. 1 carry the identical reference numerals for which detailed description is to be omitted.

In a lamp device 21 of this embodiment, a high-pressure discharge lamp 22 formed previously by a usual step is used and an annular prism 24 having an annular prism surface 24S is integrated by subsequent attaching to the arc tube 23.

FIG. 5 shows a manufacturing process of the annular prism 24.

Referring to the annular prism 24, fine quartz particles are charged in a die 25 and pressed to form a molded body 26 for sintering. After decomposing the die, the body is taken out and sintered to form a prism 24.

The die 25 comprises, as shown in FIG. 5(a), outer frames 25R and 25L divided into right and left parts, a base 25B also served as a core for forming an aperture of the annular prism 24, and a presser 25P for pressing fine quartz particles 27 filled in a cavity defined by the outer frames 25R and 15L, and the base 25B.

At first, as shown in FIG. 5(b), fine quartz particles 27 are filled in a cavity formed by assembling the outer frames 25R, 25L and the base 25B and, as shown in FIG. 5(c), they are pressed by the presser 25P to form a molded body 26 for sintering and then, as shown in FIG. 5(d), the die is decomposed and the molded body 26 for sintering is taken out and sintered to complete the annular prism 24.

When, the annular prism 24 is externally attached to the arc tube 23 from the side of one seal portion 5a and heated again with a frit glass 28 being filled in a gap relative to the discharge bulb 4, the prism 24 is fused to the discharge bulb 4 of the high-pressure discharge lamp 22.

Then, finally, when the high-pressure discharge lamp 22 is fixed such that the tube axis $Z_P$ of the high-pressure discharge lamp 22 and the optical axis $Z_L$ of the concave reflection mirror 3 is situated coaxially, the lamp device 21 is completed.

Since the outer peripheral surface of the prism 24 is formed as an annular prism surface 24S and the shape is identical with the prism surface 12S in Embodiment 1, the behavior of a light emitted from the discharge bulb 4 is substantially identical with that of Embodiment 1 in FIG. 1.

EMBODIMENT 3

FIG. 6 is an explanatory view showing a further embodiment of the present invention in which portions in common with those in FIG. 1 carry the same reference numerals for which duplicate description is to be omitted.

A lamp device 31 of this embodiment is identical with Embodiment 2 in that an annular prism 34 is integrated by subsequent addition to an arc tube 33 of a high-pressure discharge lamp 32 formed previously by a usual process, but a prism 34 formed with a plurality of multi-stepped annular prism surfaces $S_{11}$ to $S_{13}$ is used.

For the prism 34, after sintering annular molding bodies $F_{11}$ to $F_{13}$ divided into three parts used for sintering in stack as shown in FIG. 7(a) and forming a transparent prism 34 as shown in FIG. 7(b), it is fused to the arc tube 33 of the high-pressure discharge lamp 32 by way of a frit glass 35 as shown in FIG. 7(c).

Individual molding products $F_{11}$ to $F_{13}$ used for sintering are formed by press molding fine quartz particles 39 by dies 36 to 38 as shown in FIGS. 8 to 10.

In the same manner as the die 25 in Embodiment 2, the dies 36 to 38 include outer frames 36R to 38R and 36L to 38L divided into right and left parts, basis 36B to 38B serving also as pore forming apertures of the annular prism 34, and pressers 36P to 38P for pressing fine quartz particles 39 filled in cavities defined with the outer frames 36R to 38R, 36L to 36L, and the base 36B, respectively.

Then, as shown in FIG. 8(a) to FIG. 10(a), when the fine quartz particles 39 are filled in the cavities defined by assembling the dies 36 to 38 and pressed by the pressers 36P to 38P, then the dies are decomposed to take out the molding bodies $F_{11}$ to $F_{13}$ as shown in FIG. 8(b) to FIG. 10(b) and they are sintered in a state stacked as shown in FIG. 7(a), a transparent annular quartz prism 34 is completed as shown in FIG. 7(b).

When the annular prism 34 is externally fitted to the arc tube 33 from the side of a seal portion 5A and heated again with the frit glass 35 being placed in a gap with respect to the discharge bulb 4, the prism 34 is fused integrally to the discharge bulb 4 of the high-pressure discharge lamp 32 as shown in FIG. 7(c).

Then, finally, when the high-pressure discharge lamp 32 is fixed such that the tube axis $Z_P$ thereof and the optical axis $Z_L$ of the concave reflection mirror 3 is situated coaxially, a lamp device 31 as shown in FIG. 6(a) is completed.

When the high-pressure discharge lamp 32 is lit, a light is emitted from the discharge bulb 4 to the periphery thereof in forward and backward directions for a predetermined range of angle.

FIG. 6(b) is a graph showing a light distribution to the light emitting direction while defining the amount of light in the direction perpendicular to the tube axis $Z_P$ as 100% and assuming the forward direction of the tube axis $Z_P$ as 0° and the backward direction thereof as 180°. The abscissa represents the direction of the tube axis tube $Z_L$, the ordinate represents the direction passing the light emission point on the tube axis $Z_L$ and perpendicular to the tube axis $Z_L$ of the high-pressure discharge lamp 32 and the circular scales represent the ratio of the amount of light amount.

The light emitted from the discharge bulb 4 to the periphery thereof is at an amount of light of 60% or more for the range of angle from 45° to 135°, in which the light $L_1$ emitted for the range of angle $\theta_1$ (90° to 130°) on the backward side is reflected at the concave reflection mirror 3 and reaches the light collection area SP.

Further, a light $L_{11}$ emitted forward for the range of angle $\theta_{11}$ (7 to 88°) is reflected at the annular prism surface $S_{11}$, a light $L_{12}$ emitted forward for the range of angle $\theta_{12}$ (54 to 75°) is reflected at the annular prism surface $S_{12}$, and a light $L_{13}$ emitted forward for the range of angle $\theta_{13}$ (43 to 51°) is reflected at the annular prism surface $S_{13}$, and each of the lights is illuminated to the light collection area SP on the side of the front.

In this case, assuming a high-pressure discharge lamp of an existent type with no prism 34, a light $L_{22}$ emitted for the range of angle $\theta_{22}$ (82 to 145°) is reflected at the concave reflection mirror 3 and reaches the light collection area SP.

On the other hand, in this embodiment, since the prism 34 bulges outside the discharge bulb 4, a light $L_3$ for the range of angle $\theta_3$ (130 to 145°) emitted to the most backwardmost side is shielded by the prism 34.

However, among the lights lost wastefully so far, since a light $L_{14}$ at the amount of light of 100% for the range of angle $\theta_{14}$ (77 to 82°), a light $L_{12}$ at the amount of light from 80 to 100% for the range of angle $\theta_{13}$ (54 to 75°), and a light $L_{13}$ at the mount of light from 50 to 75% for the range of angle $\theta_{13}$ (43 to 51°) are reflected at the prism 34 and reach the light collection area SP situated at the front, the light utilization efficiency can be improved sufficiently even if the light $L_3$ at the amount of light of 60% or less is shielded.

EMBODIMENT 4

FIGS. 11 to 13 show a further embodiment of the invention in which portions in common with those in FIG. 1 carry the same reference numerals for which detailed description is to be omitted.

Generally, while the concave reflection mirror is circular when viewed from the front, a top end flange of the concave reflection mirror is formed into a square shape for mounting to a containing space having a square cross section when viewed from the direction of the optical axis.

However, the containing space for an illumination optical system is sometimes obliged to be formed in a rectangular shape in view of design. In this case, since the effective area of the reflection mirror is in proportion to the cube of the diameter, when the containing space is changed from a square cross section having 5 cm for one side to a rectangular shape of: W×L=5×4 cm, the effective reflection area is decreased as small as to about 50%, i.e., about 64/125 by merely decreasing the size for the side of the reflection mirror by 20%, i.e., from 5 cm to 4 cm.

As described above, since the effective utilization area is decreased drastically when the size of the reflection mirror is reduced by decreasing the diameter, the applicant trially manufactured a reflection mirror substantially of a rectangular shape by cutting off upper and lower portions of a circular concave reflection mirror as viewed from the direction of the optical axis (front) while leaving the diameter thereof as it was.

When defining the optical axis as Z tube axis and two axes perpendicular thereto as X axis and Y axis, the concave reflection mirror is formed by cutting the peripheral surface of the reflection mirror along two planes in parallel to the ZX plane with the Z axis as an axis of symmetry, in which two arched recesses are formed opposing each other in the peripheral surfaces of the reflection mirror. The depth of the reflection mirror is large when as along a horizontal cross section and the depth thereof is small viewed along a vertical cross section.

With the constitution, the effective reflection area is less decreased and lowering of the light utilization efficiency can be suppressed when compared with the case of decreasing the diameter.

However, since the arched recessed portions are formed opposing each other, this naturally results in a problem that a light which could be utilized effectively by the reflection at the recessed portion can no more be utilized and the light utilization efficiency is lowered by so much.

The lamp device of this embodiment can also overcome such a problem.

A lamp device 41 of this embodiment has a high-pressure discharge lamp 2 and a concave reflection mirror 42 having a reflection surface of a rotational concave curved shape such as an ellipsoidal mirror or a parabolic mirror for reflecting the light of the lamp.

Then, the device is used, for example, as a light source of a liquid crystal projector and arranged such that a light transmitting a light distribution optical system (homogenizer) 11 such as a rod lens or an array lens is illuminated to a liquid crystal panel as an image forming section (not illustrated).

Further, in the concave reflection mirror 42, when defining an optical axis as Z axis and two axes perpendicular thereto as X axis and Y axis, the peripheral surface of the reflection mirror 42 is cut along two planes in parallel with the ZX plane with the optical axis Z as an axis of symmetry, and two arched recesses 43A and 43B are formed opposing each other in the peripheral surface of the reflection mirror.

Then, at the outer peripheral surface of the discharge bulb 4 of the arc tube 6, two prism surfaces 44A and 44B are formed in symmetry with respect to the ZX plane at a portion crossing an optical beam emitted from the discharge bulb 4 to the recesses 43A and 43B for a predetermined range of angle in the direction of Y axis (θy for forward and backward and γy for rightward and leftward) for refracting or reflecting the light toward the light collection area SP.

In this embodiment, a ring shaped attaching portion 46 is formed to the prism 45 having the prism surfaces 44A and 44B and fitted externally to the seal portion 5A of the arc tube 6 such that the prism surfaces 44A and 44B are situated at the outer peripheral surface of the discharge bulb 4 and fixed thereto by melting a frit glass 47 filled in a gap.

The prism 45 is formed by forming a prism surface in an annular shape and then cutting both right and left sides thereof along parallel planes at a distance equal with the outer diameter of the attaching portion 46.

More specifically, in a front elevational view in FIG. 11($a$), the prism surfaces 44A and 44B are formed to a portion crossing the optical beam which is emitted to $XY_1$-$XY_2$ and $XY_3$-$XY_4$ corresponding to the recessed 43A and 43B for a range of angle $\alpha_1$ around the light emission point $P_0$ of the discharge bulb 4 as a center, so that the light emitted from the discharge bulb 4 is reflected or refracted to the light collection area SP. Further, it is adapted that the optical beam emitted to a portion $XY_2$-$XY_3$ and $XY_4$-$XY_1$ not formed with the recesses 43A and 43B for a range of angle $\alpha_2$ around the light emission point $P_0$ of the discharge bulb 4 as a center is not incident to the prism 45 but reflected directly at the reflection mirror 3.

Further, in a vertical cross sectional view above the center line in FIG. 11($b$), the prism 45 is not positioned in the optical path thereof such that a light emitted to the effective reflection surface $ZY_1$-$ZY_2$ for the range of angle $\beta_1$ around the light emission point $P_0$ of the discharge bulb 4 as the center is reflected directly at the concave reflection mirror 42. Further, the prism 45 is arranged at a portion crossing the optical beam emitted to $ZY_2$-$ZY_3$ corresponding to the recesses 43A and 43B for the range of angle $\beta_2$ around the light emission point $P_0$ as a center, the prism surfaces 44A and 44B are formed so that the light illuminated from the discharge bulb 4 is reflected or refracted to the light collection area SP.

Further, in a horizontal cross sectional area shown below the center line in FIG. 11($b$), a prism 45 is not present at a portion crossing the optical beam emitted to the effective reflection surface $ZX_1$-$ZX_2$ for the range of angle γ around the light emission point $P_0$ of the discharge bulb 4 as a center and the light is entirely reflected at the reflection mirror 3 and reaches the light collection area SP.

With the constitution described above, since also the light directing from the discharge bulb 4 to the recesses 43A and 43B is refracted or reflected at the prism surfaces 44A and 44B and reaches the light collection area SP, the light can be utilized at an efficiency substantially identical with the light utilization efficiency of a reflection mirror of an identical diameter not formed with the recesses 43A and 43B.

FIG. 13 shows a manufacturing process of the prism 45.

Referring to the prism 45, fine quartz particles 51 are charged in a die 52 and pressed to form a molded body 56 used for sintering. The die is decomposed and then the product is taken out and sintered to form an annular prism 58.

The die 52 comprises, as shown in FIG. 13($a$), outer frames 53R and 53L divided rightward and leftward, a base 53B also serving as a core for forming an aperture of the prism 45, and double cylindrical pressers 53P and 53Q for pressing the fine quartz particles 51 filled in the cavity defined by the outer frames 53R, 53L and the base 53B.

At first, as shown in FIG. 13($b$), fine quartz particles 51 are filled in a cavity defined by assembling the outer frames 53R and 53L, and the base 53B and pressed by an outer presser 53P as shown in FIG. 13($c$) and the fine quartz particles 51 are further filled.

Then, after forming a molded body 56 used for sintering by pressing an inner presser 53Q as shown in FIG. 13($d$), when the die is decomposed and the molded body 56 used for sintering is taken out and sintered, an annular prism 58 in which an annular prism surface 57 is formed to the periphery of the ring shape attaching portion 46 is completed as shown in FIG. 13(e).

Then, when the peripheral surface of the annular prism 58 is cut along parallel planes in parallel to the ZY plane at a distance equal to the outer diameter of the attaching portion 46, two prism surfaces 44A and 44B vertically symmetrical with respect to the ZX surface are formed as shown in FIG. 13(f) and a prism 45 is completed by optically polishing the entire surface thereof.

The distance between the parallel planes upon cutting the annular prism 58 is decided depending on the size of the recesses 43A and 43B formed to the reflection mirror 42.

That is, as shown in FIG. 11(a), the distance between the parallel planes is chosen such that the prism surfaces 44A and 44B are formed to a portion crossing the optical beam illuminated to for the range of angle $\alpha_1$ to $XY_1$-$XY_2$ and $XY_3$-$XY_4$ corresponding to the recesses 43A and 43B.

Then, the attaching portion 46 of the prism 45 formed as described above is externally fitted to the seal portion 5A of the arc tube 6, frit glass 47 is filled in the gap and fused to secure. When a light is emitted by a lamp device 41 in which the arc tube 6 is attached to the concave reflection mirror 42, a light emitted for an angle $\alpha_2$ in the direction of the X tube axis as viewed from the front and at an angle $\gamma$ as viewed from the horizontal cross section is reflected at the reflection mirror 3 and reaches the light collection area SP. The reflection efficiency of the optical beam is equal with the reflection efficiency of a reflection mirror having an identical diameter where the recesses 43A and 43B are not formed.

Further, if the recesses 43A and 43B were not formed to the reflection mirror 3, a light emitted for an angle $\alpha_1$ in the direction of Y tube axis as viewed from the front and for an angle $\beta_1+\beta_2$ as viewed in the vertical cross section might be entirely reflected at the reflection mirror 3 and reach the light collection area SP. However, since the recesses 43A and 43B are formed opposed each other, only the light emitted to the reflection surface $ZY_1$-$ZY_2$ for the range of angle $\beta_1$ is reflected at the reflection mirror 3 and reaches the light collection area SP.

Further, a light emitted to $ZY_2$-$ZY_3$ corresponding to the recessed 43A and 43B for the range of angle $\beta_2$ is incident to the prism 45 situated at a portion crossing the optical beam and refracted or reflected in the prism 45 and then reaches the light collection area SP.

Accordingly, since a light not reflected at the reflection mirror 42 by the provision of the recesses 43A and 43B is also refracted or reflected in the prism 45 and reaches the light collection area SP, the reflection efficiency of the optical beam is identical with the reflection efficiency of the reflection mirror having an identical diameter where the recesses 43A and 43B are not formed.

That is, in the invention, even when the two arched recesses 43A and 43B are formed opposing each other on both upper and lower sides of the peripheral surface of the reflection mirror by cutting the peripheral surface of the reflection mirror 42 along the two planes parallel to the ZX plane in order to house the reflection mirror 42 in a containment space of a rectangular cross sectional shape, since a light that might be reflected at the reflection mirror 42 and reach the light collection area SP if the recesses 43A and 43B were not present is refracted or reflected in the prism 45 and reaches the light collection area SP, a light utilization efficiency equivalent with that of the reflection mirror having an identical diameter where the recessed 43A and 43B are not formed can be obtained.

INDUSTRIAL APPLICABILITY

As has been described above, the present invention can be applied particularly, for example, to the use of a light source for a liquid crystal projector, a DLP projector, etc.

BRIEF DESCRIPTION OF THE DRAWINGS

FIG. 7 is explanatory views showing a manufacturing process of the arc tube therefore.

FIG. 8 is explanatory views showing a molding die for a prism.

Figure 1A:
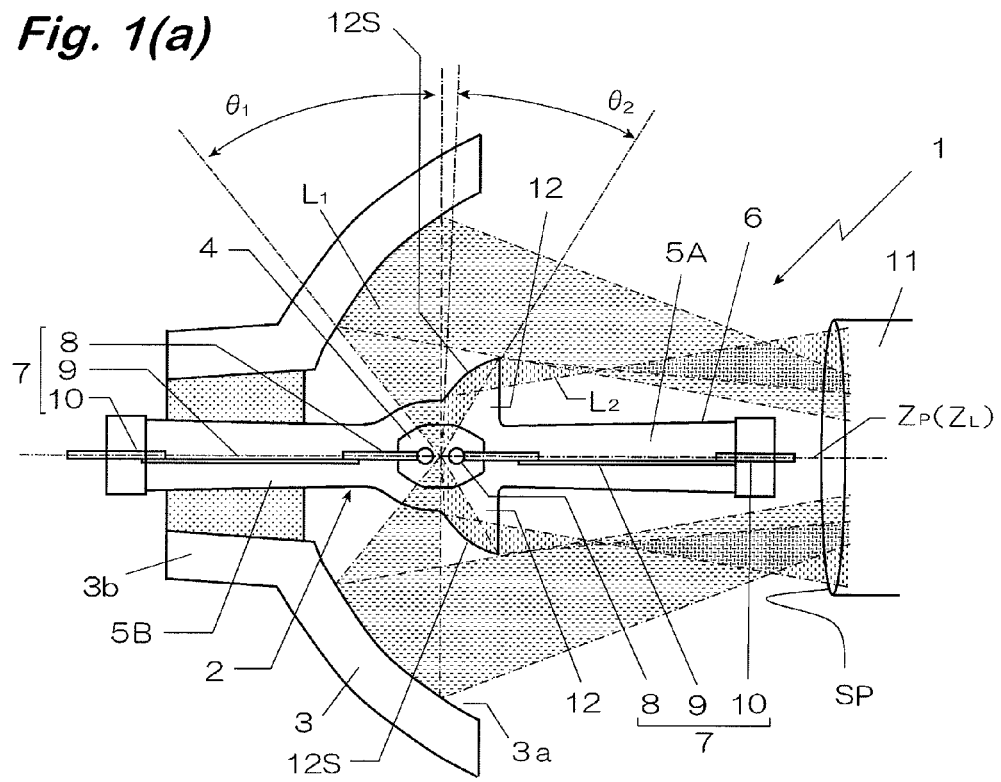
FIG. 1 is explanatory views showing an example of a lamp device according to the invention and a light distribution thereof.
Figure 1B:
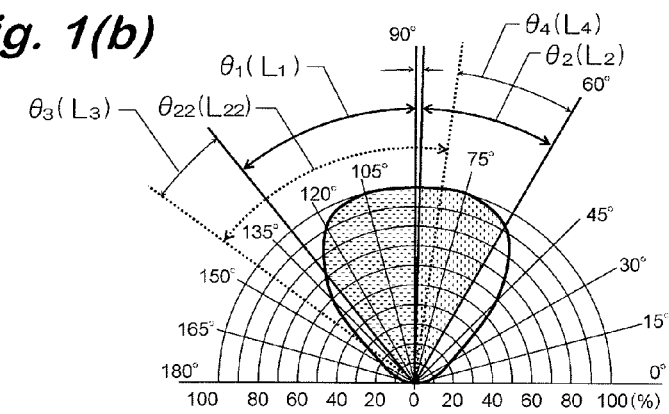
Figure 2:
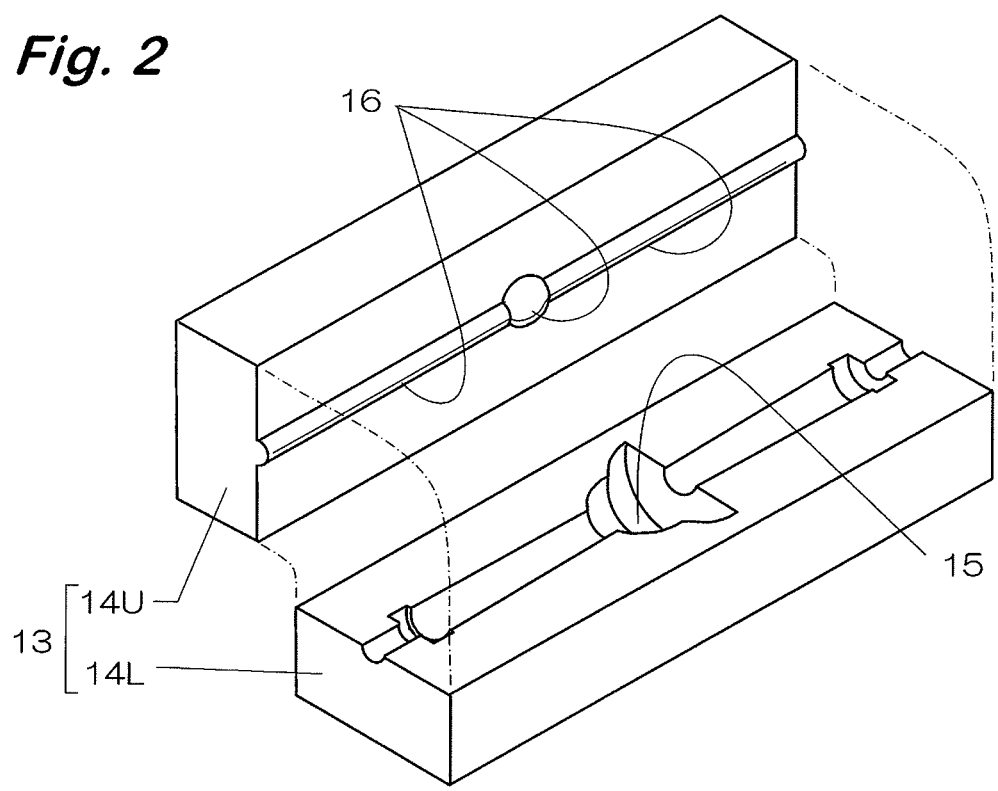
FIG. 2 is an explanatory view showing a molding die for an arc tube used therefor.
Figure 3:
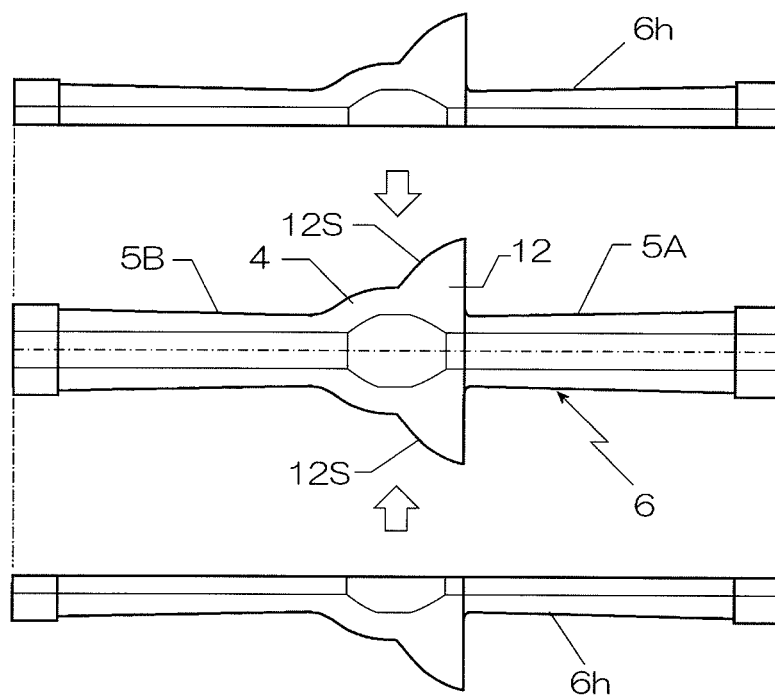
FIG. 3 is an explanatory view showing a manufacturing process of an arc tube.
Figure 4:
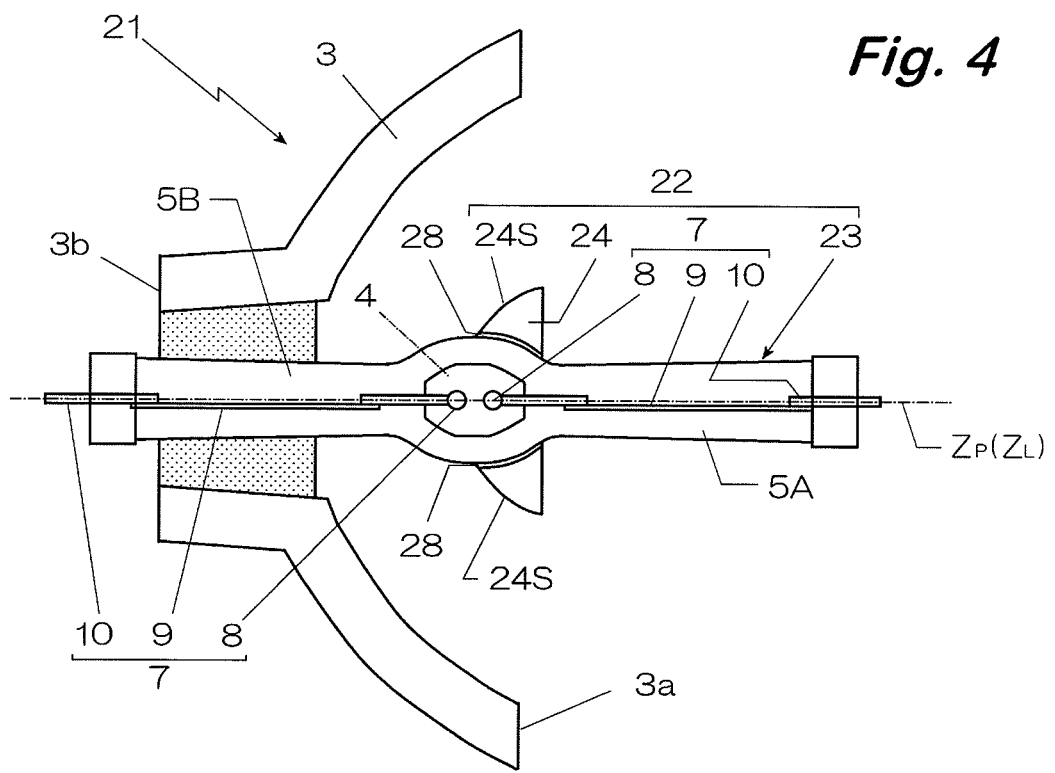
FIG. 4 is an explanatory view showing another embodiment according to the present invention.
Figure 5A:
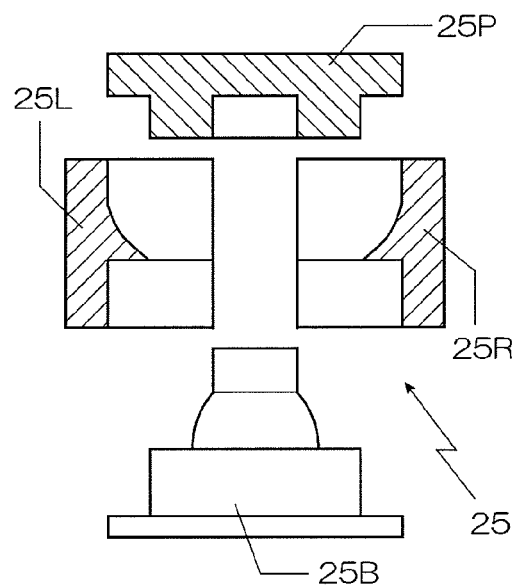
FIG. 5 is explanatory views showing a molding die for a prism used therefor.
Figure 5B:
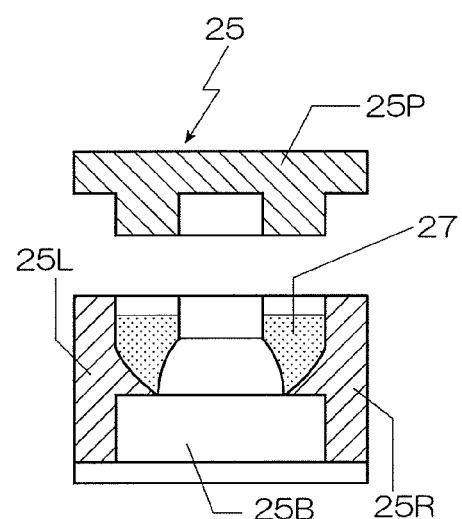
Figure 5C:
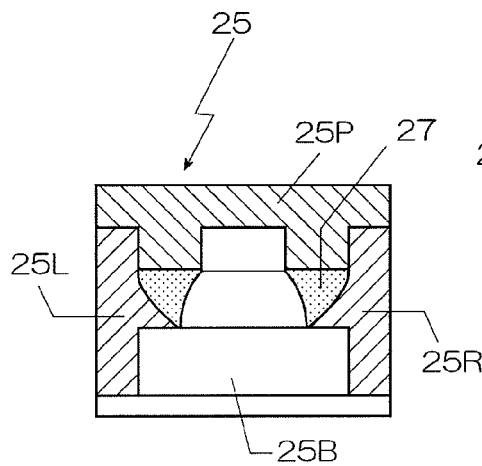
Figure 5D:
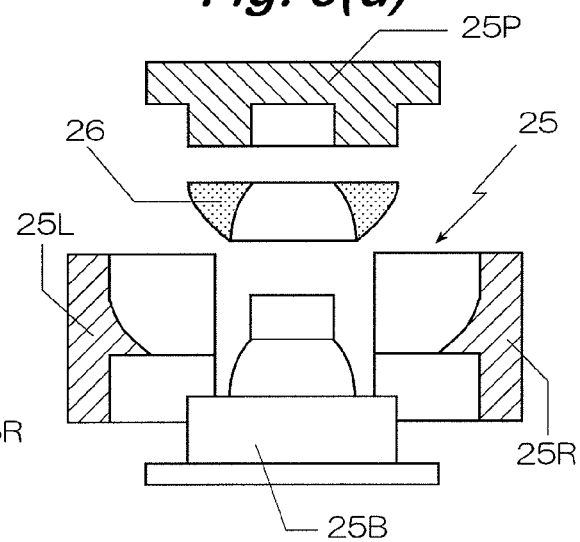
Figure 6A:
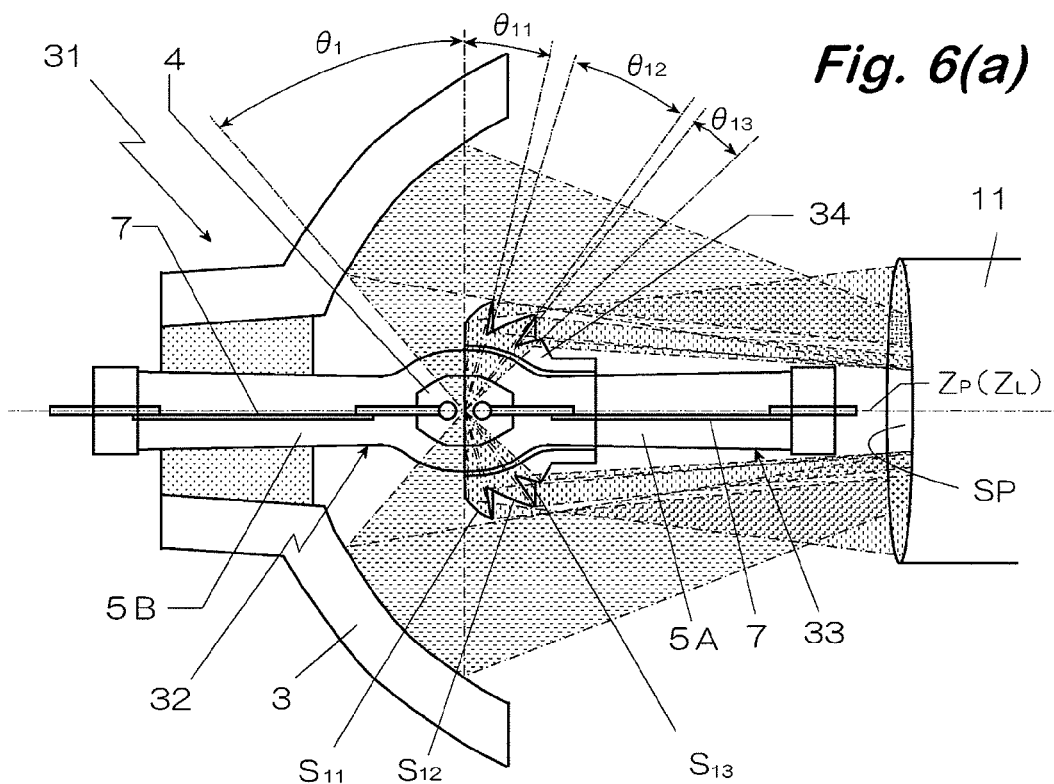
FIG. 6 is explanatory views showing a further embodiment and a light distribution thereof.
Figure 6B:
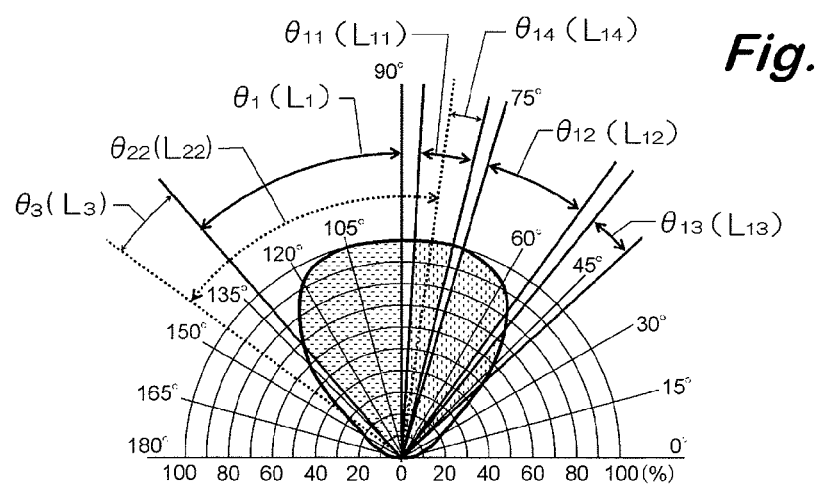
Figure 9A:
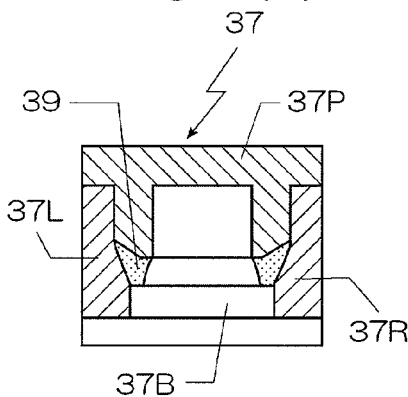
FIG. 9 is explanatory views showing a molding die for a prism.
Figure 9B:
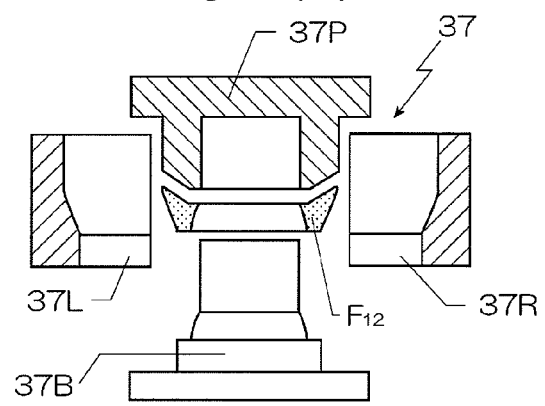
Figure 10A:
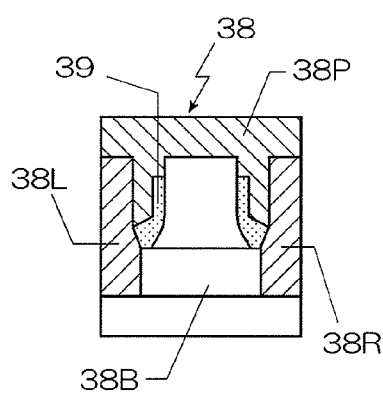
FIG. 10 is explanatory views showing a molding die for a prism.
Figure 10B:
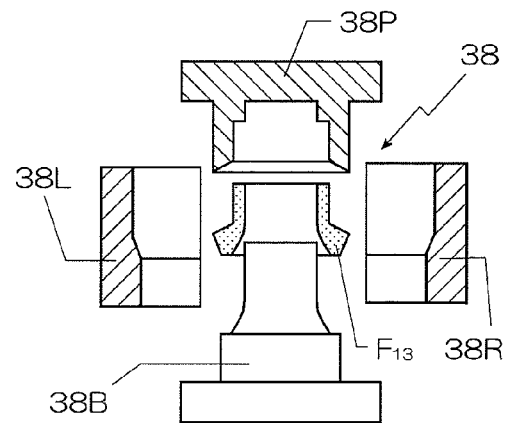
Figure 11A:
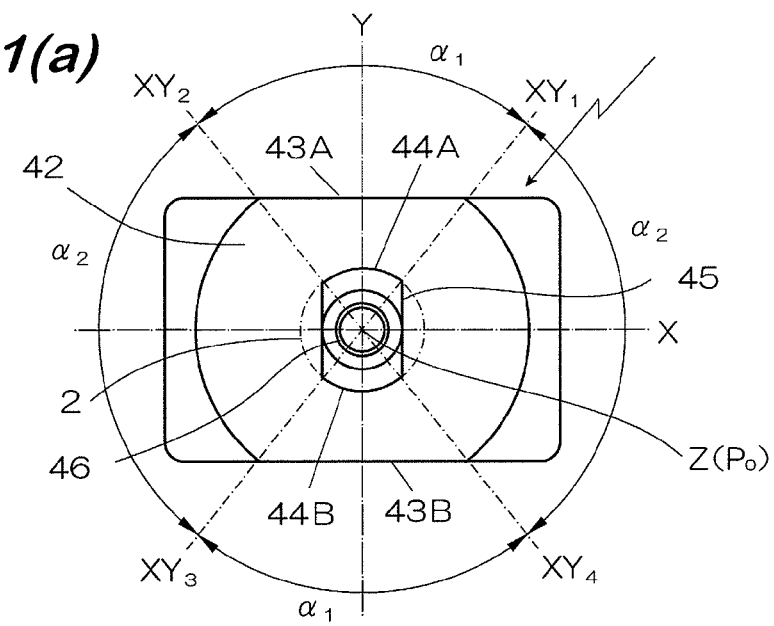
FIG. 11 is explanatory views showing a further embodiment according to the present invention.
Figure 11B:
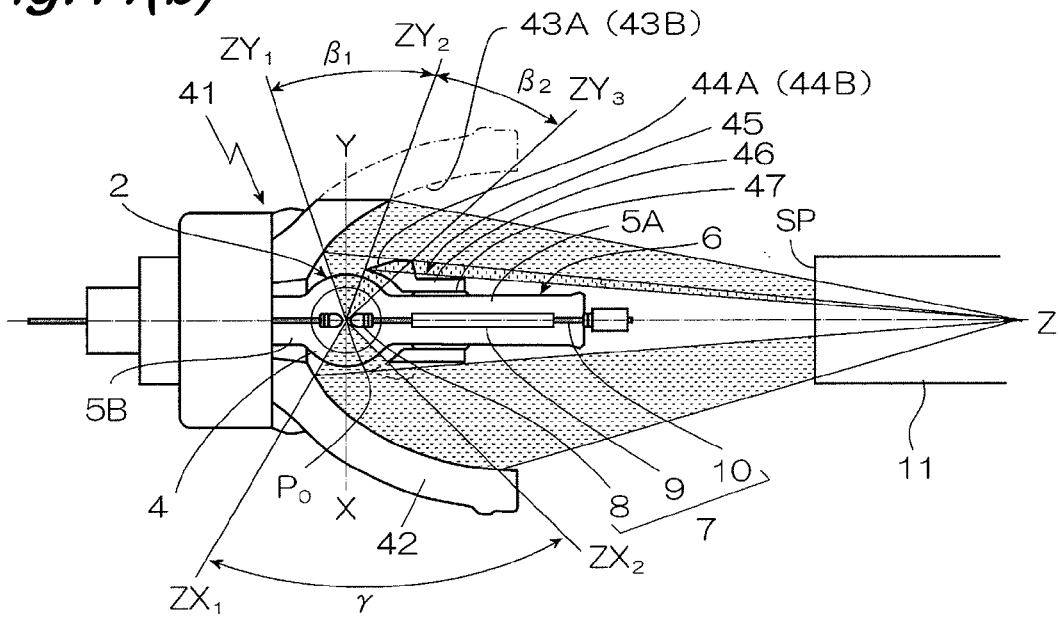
Figure 12:
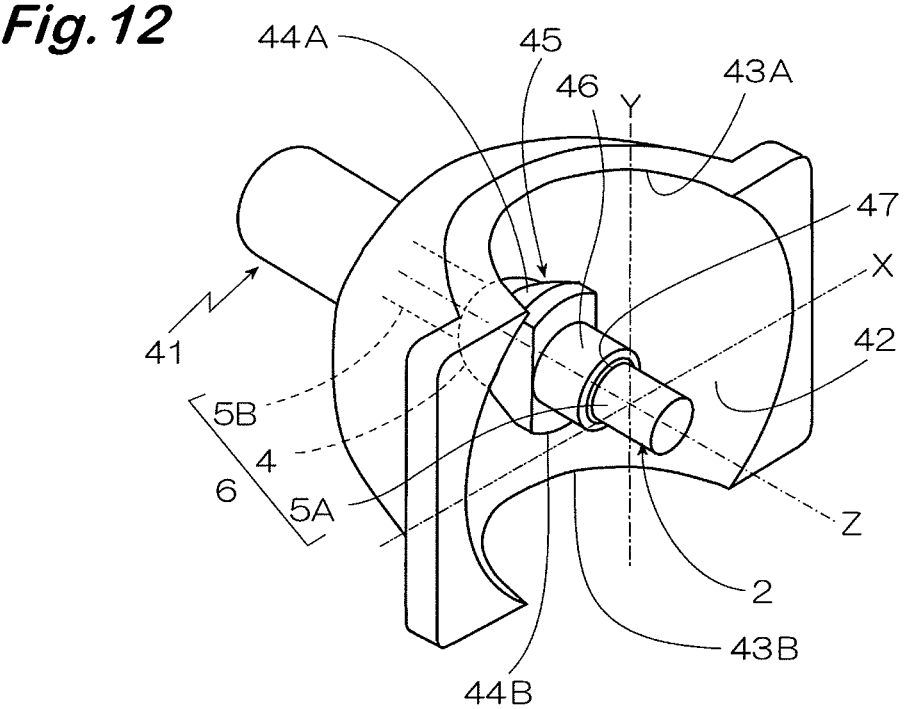
FIG. 12 is an outer view thereof.
Figure 13:
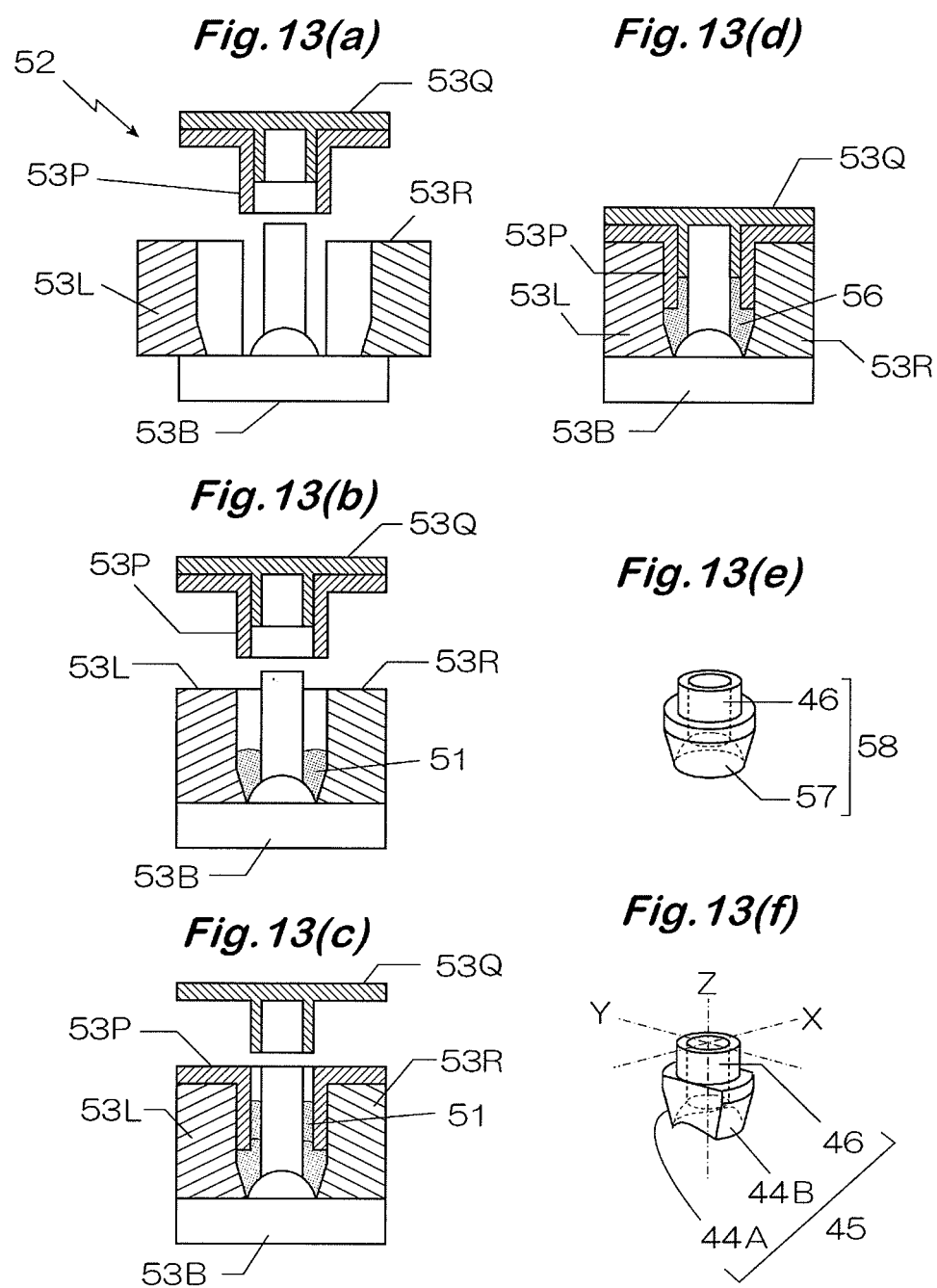
FIG. 13 is explanatory view □ showing manufacturing steps of a prism.
Figure 14:
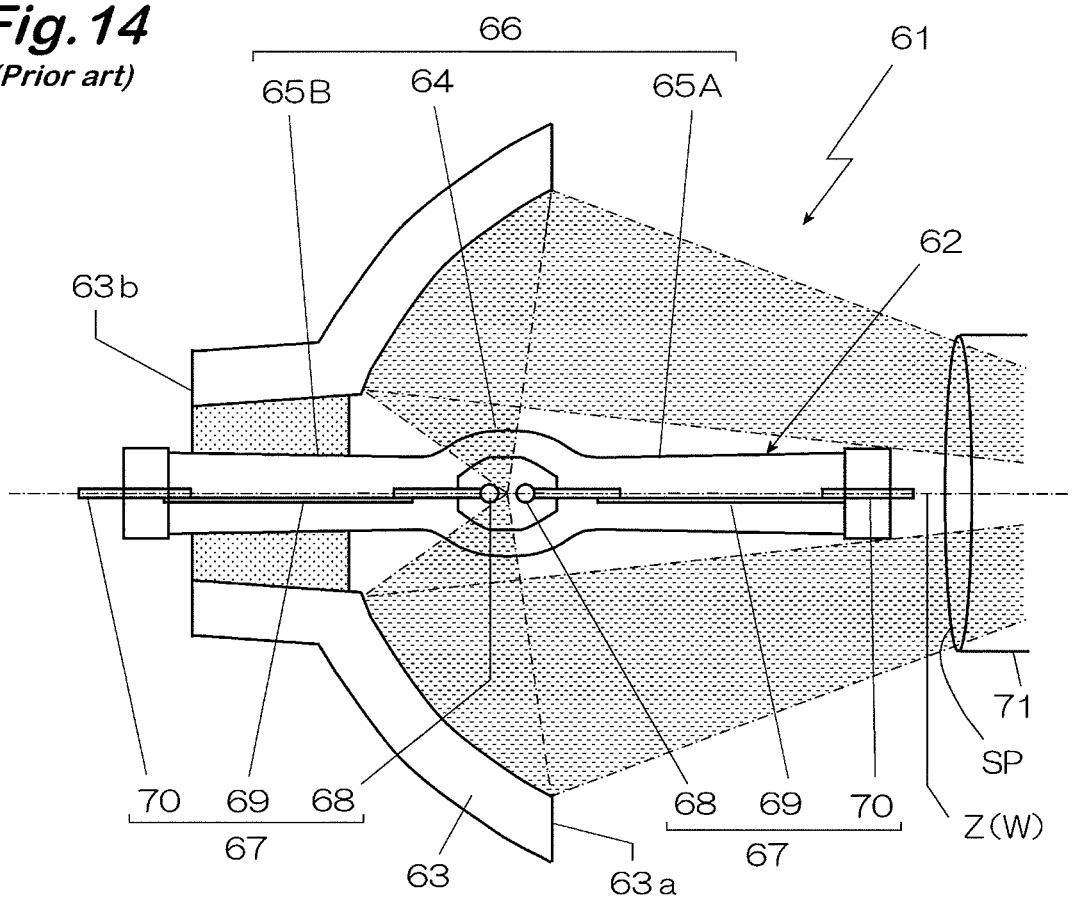
FIG. 14 is explanatory views showing an existent device.
Figure 15A:
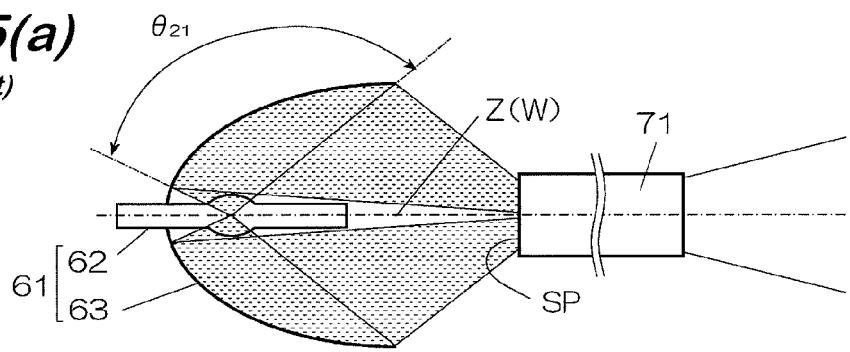
FIG. 15 is explanatory views showing a relation between the size of a reflection mirror and a light utilization efficiency.
Figure 15B:
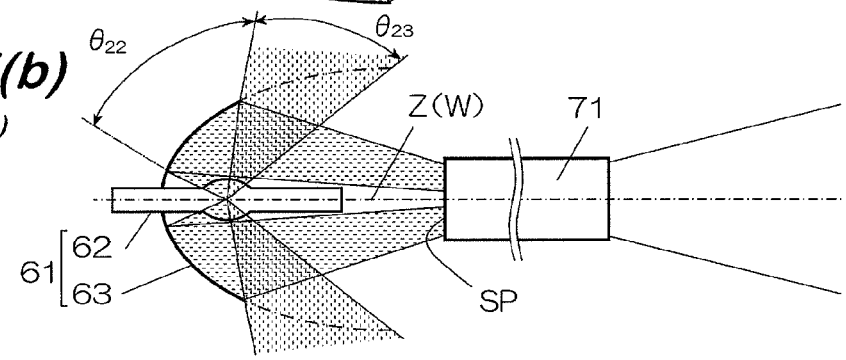
Figure 16:
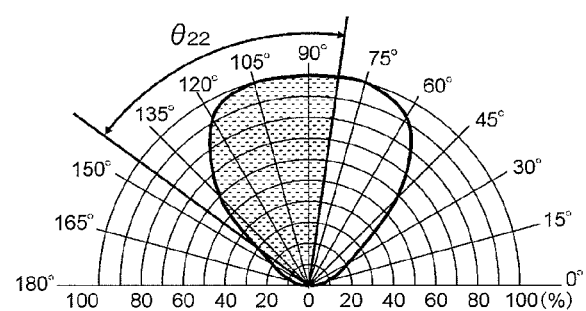
FIG. 16 is an explanatory view showing a light distribution in an existent device.
Figure 17A:
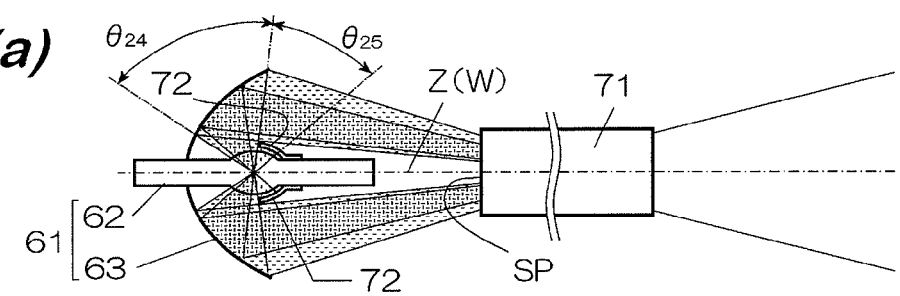
FIG. 17 is an explanatory view showing improved existent devices.
Figure 17B:
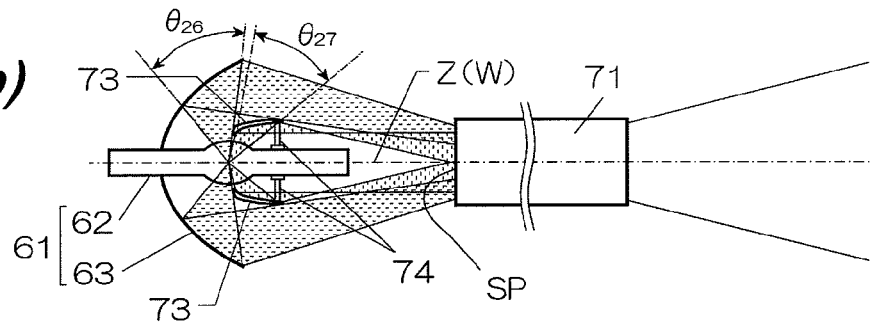

DESCRIPTION FOR REFERENCES 1 lamp device
2 high-pressure discharge lamp
3 concave reflection mirror
4 discharge bulb
5A, 5B seal portion
6 arc tube
7 electrode assembly
3a opening
3b bottom
$Z_P$ tube axis
$Z_L$ optical axis
SP light collection area
12 prism
12S annular prism surface
21 lamp device
22 high-pressure discharge lamp
23 arc tube
24 annular prism
24S annular prism surface
31 lamp device
32 high-pressure discharge lamp 33 arc tube
34 annular prism
$S_{11}$, $S_{12}$, $S_{13}$ annular prism surface
41 lamp device
42 concave reflection mirror
43A recess
43B recess
44A prism surface
44B prism surface
46 prism

The invention claimed is:

1. A lamp device, comprising:
a high-discharge lamp and a concave reflection mirror for reflecting a light therefrom, in which
the high-pressure discharge lamp has an arc tube having seal portions formed on both forward and backward ends in the direction of a tube axis interposing a discharge bulb therebetween where electrode assemblies are inserted from both of the seal portions and the seal portions are airtightly sealed in a state that discharge electrode tops are opposed each other in the discharge bulb, and is disposed in a state of aligning the tube axis with the optical axis of the concave reflection mirror, and
a portion of lights emitted from the discharge bulb to the periphery thereof in the forward and backward directions for a predetermined range of angle is reflected at the concave reflection mirror and illuminated to a light collection area of a predetermined size formed forward of the lamp, wherein
a prism surface is formed to the outer peripheral surface of the discharge bulb at an angle for refracting or reflecting at least a portion of lights emitted from the discharge bulb that is not reflected at the concave reflection mirror to the light collection area, and
the concave reflection mirror is formed with a reflection surface in a concave curved shape rotating around a Z axis as a central axis while defining the optical axis thereof as the Z axis, and two axes perpendicular thereto as an X axis and an Y axis in which the peripheral surface of the reflection mirror is cut along two planes in parallel with a ZX surface with the Z axis as an axis of symmetry to form two arched recesses opposed each other in the peripheral surface of the reflection mirror, and the prism surfaces are formed in symmetry with respect to the ZX surface at a portion crossing the optical beam emitted from the discharge bulb to the recesses for a predetermined range of angle in the direction of the Y axis.

2. A lamp device according to claim 1, wherein the prism surface is formed integrally to the outer peripheral surface of the discharge bulb.

3. A lamp device according to claim 1, wherein the prism formed with the prism surfaces is attached to the arc tube so as to be situated to the outer peripheral surface of the discharge bulb.

4. A lamp device according to claim 1, wherein a ring shaped attachment portion is formed to the prism and fitted externally to the seal portion of the arc tube such that the prism surfaces are situated at the outer peripheral surface of the discharge bulb and fixed thereto.

5. A lamp device according to claim 1, wherein
the prism surfaces are formed to a portion crossing the optical beam which is emitted to $XY_1$-$XY_2$ and $XY_3$-$XY_4$ corresponding to the recesses for a range of angle around a light emission point of the discharge bulb as a center, so that the light emitted from the discharge bulb is reflected or refracted to the light collection area, and
the optical beam which is emitted to $XY_1$-$XY_2$ and $XY_3$-$XY_4$ not formed with the recesses for a range of angle around the light emission point of the discharge bulb as a center is not incident to the prism and is reflected directly at the reflection mirror.

6. A lamp device according to claim 1, wherein the prism is not positioned in the optical path such that a light emitted to the effective reflection surface $ZY_1$-$ZY_2$ for the range of angle around the light emission point of the discharge bulb as the center is reflected directly at the concave reflection mirror.

7. A lamp device according to claim 6, wherein the prism is arranged at a portion crossing the optical beam emitted to $ZY_2$-$ZY_3$ corresponding to the recesses for the range of angle around the light emission point as a center, such that the prism surfaces are formed so that the light illuminated from the discharge bulb is reflected or refracted to the light collection area.

8. A lamp device according to claim 1, wherein the prism is not present at a portion crossing the optical beam emitted to the effective reflection surface $ZX_1$-$ZX_2$ for the range of angle around the light emission point of the discharge bulb as a center and the light is entirely reflected at the reflection mirror and reaches the light collection area.

* * * * *